Patented June 14, 1949

2,473,403

UNITED STATES PATENT OFFICE 2,473,403

HYDROPHILIC DYE INTERMEDIATES

David Willcox Woodward, Wilmington, Del., assignor to E. I. du Pont de Nemours & Company, Wilmington, Del., a corporation of Delaware No Drawing. Application February 8, 1945, Serial No. 576,906

7 Claims. (Cl. 260—87.3)

This invention relates to colloid dye intermediates. More particularly, it relates to hydrophilic polymeric colloid dye intermediates which are useful in processes of color photography. Still more particularly, the invention relates to ethers of hydrolyzed olefin/vinyl ester interpolymers wherein the components attached by an ether linkage to the polymer chain contain dye intermediate nuclei.

An object of this invention is to provide new and useful polymeric dye intermediates. A still further object is to provide such materials which can be used alone as dispersing and binding agents for light-sensitive silver salts.

The above objects can be attained by the preparation of dye intermediate ethers of hydrolyzed terminally unsaturated monoolefin/vinyl ester interpolymers. The ethers have two chemically joined components, one of which consists of a polymer chain and the other consists of a plurality of dye intermediate components having the general formula R—A— wherein R is a group containing a dye-forming nucleus and A is a divalent saturated aliphatic nucleus whose free valence stems from a methylene or substituted methylene group and is linked through an ether oxygen atom to a carbon atom of the polymer chain. In the resulting products, the dye intermediate nuclei are an integral part of the polymer molecule, i. e., the products are chemical entities and not physical mixtures of polymers and simple monomeric dye intermediates and hence there is no difficulty arising from differences in solubilities and compatibilities of the components.

This application is a continuation-in-part of Woodward United States application Serial No. 528,946, filed March 31, 1944, now Patent No. 2,415,381.

These hydrophilic dye intermediate ethers can be prepared by etherification of the hydrolyzed olefin/vinyl ester interpolymers with dye intermediate components containing a reactive group attached to a non-aromatic hydrocarbon group, e. g., a methylene group. Such reactive groups are hydroxyl or halogen, e. g., chlorine, bromine and iodine. Alternatively, the dye intermediate component can be joined by use of a bifunctional connecting agent such as an aldehyde, e. g., acetaldehyde, benzaldehyde, formaldehyde or materials which release formaldehyde or react like formaldehyde. The dye intermediate components are added in such amounts that a plurality of ether groups are present in each molecule of the final hydrophilic dye intermediate polymer.

By dye intermediates or color-formers are meant nuclei containing groups which are capable of coupling with the oxidation products of color coupling aromatic primary amino developing agents formed on development of silver salt images to form a quinoneimine (including indamine, indoaniline and indophenol) dye or an azomethine dye. These dye intermediate nuclei are also capable of coupling with diazotized aromatic amines to form azo dyes.

Nuclei of the above type are well-known in the dye art and color photography art. They are sometimes called color-formers, coupling components, etc.

These dye intermediate nuclei have as the active coupling groups a structure which may be represented as

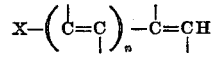

wherein X is HO or RHN, where R is hydrogen or an alkyl radical, which may be substituted, e. g., methyl, ethyl, hydroxyethyl, β-chlorethyl, benzyl, dodecyl, etc., and $n$ is 0 or 1. This group is found in the reactive methylene dye intermediates and in aromatic hydroxyl and amino compounds and includes the reactive ethenol, aminoethenyl, 4-hydroxy- and 4-amino-1,3-butadienyl groups. These groups occur in phenols, naphthols, anilines, naphthylamines, acylacetamides, cyanoacetamides, beta-ketoesters, pyrazolones, homophthalimides, coumaranones, indoxyls, thioindoxyls, etc.

The reactive ethenol group represented by

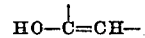

occurs in phenols and naphthols which couple in the ortho position and in the alkali soluble or enol form of most reactive methylene dye intermediates. These reactive methylene groups have a hydrogen rendered mobile by the proximity of certain unsaturated groups such as for example

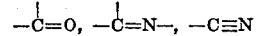

and others. The —CH₂— group is usually present between two such groups, for example,

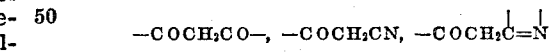

in a cyclic or acyclic system.

The reactive aminoethenyl group,

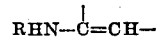

occurs in aromatic amino compounds which couple in the ortho position.

The 4-hydroxy- and 4-amino-1,3-butadienyl groups represented as

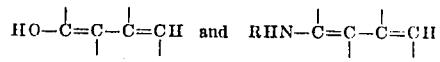

occur in phenolic, naphtholic and aromatic amino compounds which couple in the para position.

In all of these dye intermediate groups the hydrogen atoms in the coupling reactive position may be replaced by groups readily eliminated in the coupling reaction, e. g., halogen, sulfonic acid, carboxylic acid, etc.

The preferred compounds are color-forming ethers of hydrolyzed ethylene/vinyl acetate interpolymers of a mol ratio of 0.2 to 0.02 of ethylene to one of vinyl acetate, in which the color-former nuclei are joined to the interpolymer chain through a —CH$_2$O— group. These compounds can be advantageously prepared by reacting formaldehyde or a formaldehyde-yielding material in a solution or suspension of the hydrolyzed ethylene/vinyl acetate interpolymer and color former in the presence of a condensation catalyst. The reaction may be carried out simultaneously or stepwise. For example, formaldehyde may be reacted with such hydrolyzed ethylene/vinyl acetate interpolymer to form a methylol derivative which may then be condensed with the color-forming compound or preferably the formaldehyde may be condensed with the color-forming compound and the resulting methylol derivative condensed with the aforedescribed hydrolyzed interpolymers. The resulting compounds may be represented by the general formula:

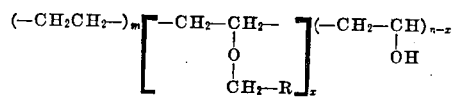

wherein the carbon atoms of the respective units form a chain of carbon atoms in the polymeric molecule, R is a dye intermediate nucleus as previously defined, $n$ is at least 100, $m$ is not more than $0.2n$ and $x$ is $1/100n$ to $3/10n$.

In the previous formula the chain nucleus is that obtained from the hydrolysis products from the ethylene/vinyl acetate interpolymers. The hydrolysis products are substantially free from acetate groups and are interpolymers of the formula

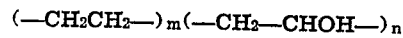

in which $n$ is at least 100 and $m$ is less than $0.2\,n$.

Hydroxyl polymers of the aforedescribed type suitable for use in preparing the novel hydrophilic polymeric dye intermediate ethers of this invention may be prepared from the polymers described in copending application Serial No. 446,116, filed June 6, 1942, now abandoned. They are obtained by the interpolymerization of vinyl esters and ethylene to yield an interpolymer having less than 0.2 mol of olefin to 1 vinyl ester, followed by partial or complete hydrolysis.

Hydrolysis or alcoholysis of the ethylene/vinyl ester interpolymers is preferably carried out by dissolving the interpolymer in an alcohol such as methanol or ethanol, or in a mixture of an alcohol and a hydrocarbon such as toluene, and then treating with a suitable hydrolyzing agent or catalyst such as alkali, e. g., NaOH, KOH, or mineral acid, e. g., HCl, H$_2$SO$_4$, etc. The hydrolysis may be partial or complete, depending on the nature of the solvent, the amount and kind of catalyst used, and the time and temperature of reaction. The following general principles apply: (1) the greater the amount of vinyl ester in the interpolymer, the more rapid the rate of hydrolysis; (2) alkaline hydrolyzing agents give more rapid rates of hydrolysis than mineral acid catalysts.

The term "hydrolysis" as used herein and in the accompanying claims is intended to include alcoholysis as well as hydrolysis with the use of water. Regardless of whether water or an alcohol is used to split off the ester groups in the interpolymer, the product is the same.

Complete hydrolysis can be obtained in most cases by dissolving the interpolymer in alcohol or alcohol-toluene to give about a 10% solution, adding an excess of sodium or potassium hydroxide in alcohol and refluxing for about one hour.

The hydroxyl polymers containing (CH$_2$)$_n$ where $n=2$ to 4 groups attached to

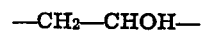

groups, may be modified, if desired, by further reaction to introduce minor portions of other groups, e. g., acetal, ester, ether groups, etc. However, all of the products useful in preparing the color-forming ethers of the present invention have the group —CH$_2$—CHOH— representing at least 50% of the polymer chain, i. e., for every 100 chain atoms there are at least 25 hydroxyl groups. Further, it is preferred that the final color-forming ethers themselves contain at least 12.5 hydroxyl groups for every 100 chain atoms, and that the polymer consists of at least 25% (—CH$_2$—CHOH—) groups so that they will have the desired permeability-solubility characteristics as herein defined. It is also preferred that between 1 and 30 color-forming ether groups shall be present for each 100 chain atoms. The color-forming compounds are highly polymeric (by this is meant having a polymer chain in excess of 200 carbon atoms) and strong unsupported films may be formed from them. They have a high softening point. The preferred dye intermediate polymeric ethers are not dissolved by cold water (20° C.) but are soluble to the extent of at least 5 parts in 100 parts of boiling water or a boiling mixture of water containing not more than 50% of a water-miscible organic solvent, and preferably not more than 25% of ethanol.

The above limitations enable the compounds to fulfill the rigorous physical demands required of dispersing and binding agents used in preparing light-sensitive silver salt layers of photographic elements. The novel hydrophilic polymeric color formers possess a unique combination of properties among which may be mentioned (1) ability to form a strong coherent unsupported film, (2) ready permeability to water and photographic processing solutions at temperatures in the neighborhood of 20° C., (3) insolubility and freedom from softening in water at moderate temperatures, (4) transparency and freedom from color, (5) adequate solubility in satisfactory solvents for coating, (6) freedom from adverse action on sensitive silver salts, (7) a relatively high softening point, (8) ability to disperse, prevent coagulation, and sedimentation of silver salts.

The hydrophilic polymer ether color formers of the present invention, when associated with light-sensitive silver halides, combine not only the above properties but, in addition, function as chromogens. In fact, the number of color-coupling groups in the polymer can be controlled so as to contribute not only adequate color-forming capacity but also a portion of the desired solubility/permeability balance required for a satisfactory carrier for the light-sensitive material.

The introduction of dye intermediate ether group in controlled amounts usually reduces the water solubility somewhat. However, if the color-forming group contains a solubilizing group, the solubility of the final product may be increased slightly. It is often satisfactory merely to balance the dye intermediate ether groups and hydroxyl groups in the correct ratio to obtain the ideal permeability and film properties. If in any one polymer the color-former substitution which gives the optimum color or chromogenic development does not yield the desired solubility, this is corrected by the introduction of other groups such as acetal, ether, or ester groups designed to have the proper solubilizing or insolubilizing effect. For instance, acetal formation with benzaldehyde decreases water solubility while with o-sulfobenzaldehyde water solubility is increased.

The invention will be further illustrated but is not intended to be limited by the following examples.

*Example I*

A mixture of 100 parts of o-hydroxybenzyl alcohol, 100 parts of pulverized completely hydrolyzed ethylene/vinyl acetate polymer of mol ratio 0.07 of ethylene to 1.0 of vinyl acetate, 400 parts of dioxane and 2 parts of 85% phosphoric acid is stirred at 80° C. for 6 hours, then diluted with 1000 parts of acetone and filtered. The solid material is extracted for 12 hours with acetone, then dried to give 114 g. of a white, hydrophilic color-forming polymer having the following probable color unit structure:

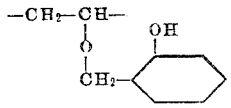

The gain in weight indicates a substitution of about 6% of the hydroxyl group, i. e., about 10 out of every 100 chain atoms contain a color-forming group.

*Example II*

A solution of 200 parts of phenol and 400 parts of 20% sodium hydroxide is cooled to 15° C. and mixed with 60 parts of 37% Formalin solution and let stand at 25° C. for 60 hours. The solution is then almost neutralized by adding 100 parts of concentrated sulfuric acid, the mixture being kept at 20° C. by addition of ice. The phenolic compounds are separated from the aqueous fraction by extraction with ether. The ether extracts after washing and drying are evaporated under reduced pressure at 20° C. and added to a mixture of 100 parts of hydrolyzed ethylene/vinyl acetate polymer of mol ratio about 0.05 of ethylene to 1 of vinyl acetate and 300 parts of dioxane containing 5 parts of 85% phosphoric acid. The mixture is stirred for six hours at 80° C. diluted with 1000 parts of acetone, filtered and extracted with acetone for 12 hours to yield 120 parts of a white powder soluble in boiling 10–50% ethanol. This product is an o-hydroxybenzyl ether of the same general structure as the product of Example I.

*Example III*

A mixture of 15 parts of hydrolyzed ethylene/vinyl acetate interpolymer of about 3 to 4% ethylene content by weight, 30 parts of 2-hydroxy-3-methyl-5-chlorobenzyl alcohol (prepared from formaldehyde and p-chloro-o-cresol), 80 parts of dioxane and 2 parts of 85% phosphoric acid are stirred at 80° C. for 2 hours, then 5 parts of acetic anhydride is added and the stirring continued for 1 hour at 80° C. The product, a polymeric 2-hydroxy-3-methyl-5-chlorobenzyl ether, is washed and extracted with acetone and dried.

*Example IV*

In a preparation similar to that recorded under Example II, 250 parts of o-phenylphenol is used in place of the phenol. Ten parts of the resulting white polymer, a 5% substituted 2-hydroxy-3-phenylbenzyl ether of the hydrolyzed ethylene/vinyl acetate polymer is dissolved in a mixture of 50 parts of water and 50 parts of ethanol at 80° C.

*Example V*

A mixture of 42 parts of alpha-naphthol, 105 parts of dioxane, 1 part of 85% phosphoric acid, 5 parts of decolorizing charcoal and a small amount of sulfur dioxide is boiled and filtered, then mixed with 22 parts of hydrolyzed ethylene/vinyl acetate interpolymer containing about 5% ethylene by weight, 20 parts o-sulfobenzaldehyde, 1 part of 85% phosphoric acid, 50 parts of dioxane, and stirred for one-half hour at 70° C. Then 7.5 parts of paraformaldehyde is added and stirring at 70° C. is continued for two hours. The mixture is then diluted with 500 parts of acetone, filtered, and extracted with acetone. The product is a mixed (1-hydroxy-2-naphthyl)-methyl ether/benzaldehyde-o-sulfonic acid acetal of a hydrolzed ethylene/vinyl acetate interpolymer. It yields bright blue dye images upon color coupling development of silver halide images with p-aminodiethylaniline.

*Example VI*

A mixture of 22 parts of hydrolyzed ethylene/vinyl acetate polymer of the type specified in Example V, 30 parts of o-sulfobenzaldehyde, 100 parts of dioxane, and 2 parts of 85% phosphoric acid was stirred at 80° C. for ½ hour. Then a mixture of 45 parts of phenylmethylpyrazolone and 7 parts of paraformaldehyde preheated to 70° C. is added and the mixture stirred for 2 hours at 75° C., then washed with acetone and extracted. The resulting light tan powder, namely, the mixed (3-methyl-1-phenyl-5-pyrazolone-4-yl)methyl ether/benzaldehyde-o-sulfonic acid acetal of hydrolyzed ethylene/vinyl acetate interpolymer, is soluble in hot 20% ethanol. It yields brilliant magenta dye images upon color coupling development of silver halide images with p-aminodiethylaniline.

*Example VII*

A mixture of 56 parts of o-chloroacetoacetanilide, 50 parts of 37% Formalin solution, 100 parts of 50% alcohol, and 2 parts of concentrated hydrochloric acid is warmed together at 50° C. for one hour, cooled, diluted with water, decanted, washed with water, and dried, and dissolved in 200 parts of dioxane. To this solution is added 22 parts of hydrolyzed ethylene/vinyl acetate polymer of about 3% ethylene content by weight and 2 parts of phosphoric acid and the mixture stirred at 80° C. for two hours. The product, a polymeric ether of the following probable color unit structure:

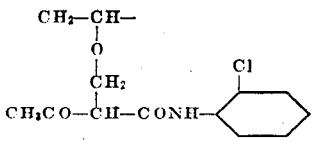

is washed and extracted with acetone and dried to give 25.5 parts of a white powder soluble in boiling water. It yielded a yellow dye image upon color coupling development of silver halide images with p-aminodiethylaniline.

*Example VIII*

A solution of 25 parts of methyl chloromethyl ether in 60 parts of dioxane is added slowly to a suspension of 40 parts of sodium acetoacetanilide in 150 parts of dioxane. The mixture is stirred 15 minutes and filtered. The filtrate is diluted with 750 parts of water and allowed to stand for one hour. The precipitate is filtered, washed with water, dried, dissolved in 25 parts of dioxane, and added to a mixture of 22 parts of hydrolyzed ethylene/vinyl acetate polymer of the type specified in Example VIII, 125 parts of dioxane, and 1 part of 85% phosphoric acid. The mixture is stirred for six hours, diluted with acetone, filtered, and extracted with acetone. The resulting polymer is similar in structure to that of Example VII and yields a yellow dye image upon color coupling development of silver salt images with p-aminodiethylaniline.

*Example IX*

A mixture of 28 parts of N-phenylacetoacetanilide, 3 parts of paraformaldehyde, 135 parts of dioxane is heated at 80° C. for one hour then diluted with 300 cc. of water and extracted twice with ether. The ether solution is dried, filtered, and evaporated to about 25 parts, then dissolved in 50 parts of dioxane. This dioxane solution is added to a mixture of 20 parts of hydrolyzed ethylene/vinyl acetate polymer of mol ratio about 0.07 of ethylene to 1 of vinyl acetate, 1 part of 85% phosphoric acid, and 150 parts of dioxane. The mixture is heated three hours at 75°–80° C., washed several times with acetone, and extracted. This material is a partially substituted polymeric ether containing the following probable color unit structure:

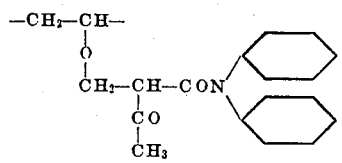

In place of any of the specific hydrophilic color-forming ethers employed in the above examples there may be used other color-coupling ethers of hydrolyzed olefin/vinyl esters which have similar physical properties. Since different color-forming groups have different effects on the solubility and permeability, it is often necessary, in order to secure the desired properties, to employ hydrophilic hydroxyl polymers (i. e., hydrolyzed olefin/vinyl esters) of different viscosities and different solubilities. If a product is obtained which is too soluble, a higher viscosity material or one containing more olefin may be used, but if the color-forming polymer is slightly too insoluble or impermeable, a lower viscosity polymer or one containing less olefin should be employed. Other useful methods of controlling the solubility and permeability include the substitution of a part of the hydroxyl groups of the hydroxyl polymer with, for instance, ester, acetal, or ether groups. The presence of a minor portion of acetate groups increases the water solubility while larger amounts decrease the water solubility. Acetal groups decrease water solubility and increase the solubility in organic solvents or solvent-water mixtures. To secure a greater insolubilizing effect, a small percentage of aromatic ester or acetal groups may be introduced. For example, if the final color-forming binding agent is too soluble, one of the following derivatives can be employed: An ethylene/vinyl acetate interpolymer of 0.05 to 0.2 mol ratio, (1) 60 to 75% hydrolyzed, (2) 100% hydrolyzed which has been not more than 20% acetalized with butyraldehyde, (3) 100% hydrolyzed followed by 10% or less esterification with benzoic acid, (4) 100% hydrolyzed and approximately 5% acetalized with benzaldehyde or (5) completely hydrolyzed followed by esterification with not more than 10% butyric ester groups. Such substitution can, of course, be introduced prior or subsequent to condensation of the colorformer with the interpolymer. If, on the other hand, a greater solubilizing effect is desired, acidic salt-forming groups, e. g., sulfonic or carboxylic acid groups can be introduced either on the color-forming nucleus or by acetal formation with aldehyde acids, by partial esterification with dibasic acids or by ether formation with hydroxyacids, etc. For example, if the color-forming binding agent is too low in solubility one of the following derivatives can be employed: (1) a completely hydrolyzed ethylene/vinyl acetate interpolymer of 0.02 to 0.1 mol ratio of ethylene to 1 of vinyl acetate up to 20% acetalized with phthalaldehydic acid, benzaldehyde ortho-sulfonic acid, glyoxylic acid, etc., (2) having on 20% or less of the hydroxyl group half esters of phthalic, succinic, etc. acids, (3) 20% or less etherified with glycolic acid. Such groups also can be introduced either before or after condensation of the color former with the polymer.

The preferred reaction for preparing these new color-forming binding agents involves ether formation through formaldehyde to give a compound having each of the color-forming nuclei attached through a methylene group to an ether oxygen which is in turn attached to a carbon of the linear carbon chain of the polymer.

The color-forming nuclei need not, however, be attached directly to the methylene ether group. Non-color-forming formaldehyde reactive groups, e. g., amide, mercapto, or aliphatic amino or hydroxyl may be present in the dye former and react with the formaldehyde to form methylol derivatives capable of condensing with the hydroxyl groups of the polymer to form ethers. Alternatively, other etherification methods may be employed. In all of these compounds a bifunctional non-color-coupling radical may intervene between the ether methylene groups and the color coupling nuclei.

Thus, the color-forming nuclei can be joined to the polymer chain through other ether groups such as —OCH₂COX, —OCH₂CH₂X, —OCHRX, —OCR₂X, —OCH₂CH₂SX,

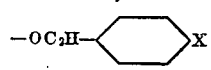

—OCH₂OCH₂COX, —OCH₂CHOHCH₂OX
—OCH₂OCH₂X, —OCH₂CH₂NHX
—OCH₂CHOHCH₂NHX, etc., wherein the R groups are hydrogen or small alkyl radicals and X is a color-forming group as herein described by the following representative methods: (1) The hydrolyzed olefin/vinyl ester interpolymer is stirred or milled with 10 to 20% aqueous sodium hydroxide and a color-former containing an aliphatic chloride, bromide or iodide group is added and the mixture stirred and warmed to split out hydrogen halide from the reactants thus connecting the color-forming nuclei to the polymer chain through an ether linkage, (2) a partial glycolic acid ether is formed by reaction of the hydrophilic polymer with chloroacetic acid and sodium hydroxide after which the carboxylic acid groups are converted to amides by reaction with color-forming compounds containing amino groups or (3) by reduction of nitrobenzyl ethers of hydrolyzed olefin/vinyl ester interpolymers followed by reaction with color-former acid chlorides.

In addition to the ether color-forming groups of the above examples, many of the other well-known color-coupling components may be employed. Thus, the dye intermediate nucleus may be any phenol, naphthol or aromatic amine having a coupling position available ortho or para to the aromatic hydroxyl or amine group or any active methylene compound, i. e., a compound having a —CH$_2$— group activated by two unsaturated groups taken from the class of

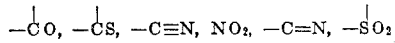

—CONH—, —COOalkyl, —COOaryl, —N=C, connected either directly or through a conjugated system. Such active methylene compounds are distinguished by their ability to enolize in alkaline solution forming a soluble alkali metal salt and include many acyclic and heterocyclic compounds known in the art. Examples of such active methylene compounds include (1) beta-ketoacylamides of the type RCOCH$_2$CONHR'; where R is a hydrocarbon or heterocyclic radical and R' is preferably aromatic, e. g., benzoylacetanilide, furoylacetanilide, p-acetoacetamidobenzoic acid, naphthoylacetanilide, p-nitroacetanilide, 2.5 dichloroacetoacetanilide, (2) pyrazolones, e. g., 1-p-carboxyphenyl-3-methyl-5-pyrazolone, 1-phenyl-3-carboxy-5-pyrazolone, 1-p-chlorophenyl-3-methyl-5-pyrazolone, 1-m-sulfophenyl-3-phenyl-5-pyrazolone, (3) benzyl cyanides, e. g., p-nitrobenzylcyanide, (4) indoxyl and thioindoxyl, (5) homophthalimides, e. g., N-phenylhomophthalimide, N-beta-naphthylhomophthalimide, N-dodecylhomophthalimide, (6) 2,4-dihydroxyquinoline, (7) diketohydrindene, (8) malonamides, e. g., N,N'-diphenylmalonamide, ethyl N-phenylmalonamate, (9) phenacylpyridinium halides, (10) hydroxypyridines, (11) cyanacetanilide, (12) benzoylacetonitrile, (13) ethyl cyanoacetate, etc.

In the method of preparing these polymeric color-forming binding agents employing formaldehyde to connect the color-former to the hydroxyl polymer chain, the formaldehyde may be in any form. Thus, it can be used as solid paraformaldehyde or dissolved or suspended in water or solvents for the color former, or there may also be used formaldehyde-releasing compounds, such as trioxan, hexamethylenetetramine, methylene diacetate, or compounds capable of forming methylol derivatives, e. g., chloromethyl ether, etc.

Alternatively, dimethylol derivatives of amides, ureas, etc., e. g., dimethylolurea, dimethyloladipamide, dimethyloloxamide and their ethers such as bis-methoxymethylurea may be used in place of formaldehyde for linking the dye intermediates to the polymer chain.

The term "hydrophilic" as used in this application and claims, when referring to the dye intermediates, etc., is intended to denote compounds which in the form of thin layers, e. g., one to ten microns in thickness are insoluble in water at 20° C. but are freely water permeable.

The preferred embodiment of the invention contemplates the use of color formers derived from interpolymers of vinyl acetate with less than 0.2 mol (less than 12% by weight) of ethylene per mol of vinyl acetate because of their superior film properties. However, other aliphatic terminally unsaturated mono-olefins also are useful in preparing the products of this invention. The limitation to aliphatic terminally unsaturated mono-olefins is made on the basis of ease of preparation of satisfactory polymers in good yield. Thus, the purely aliphatic olefins interpolymerize with vinyl esters in contrast to a non-aliphatic olefinic compound such as styrene which, as is well-known, inhibits polymerization of the vinyl esters. Similarly, it has been found that the terminally unsaturated olefins enter into the copolymerization more readily than such olefins as butene-2, the terminal carbon atoms of which are saturated. Mono-olefins are utilized exclusively because it has been found difficult to obtain stable, soluble interpolymers from vinyl esters and di- or polyolefins. Because of their availability and because they have been found to enter into the copolymerization readily the aliphatic terminally unsaturated mono-olefins containing less than 5 carbon atoms are preferred. The interpolymers containing an olefin/vinyl ester mol ratio of 0.2 to 0.02 are best suited for use in preparing the products of this invention. When the olefin contains less than 5 carbon atoms this corresponds to an olefin content of 20% or less by weight. Any hydrolyzable polymerizable vinyl ester can be used as far as is known. The vinyl esters of the lower fatty acids such as vinyl acetate or vinyl propionate are preferred by virtue of their availability, ease of copolymerization and low cost.

The new color forming hydrophilic polymeric ethers of this invention are especially useful in the preparation of dye images utilizing photographic developing agents which couple therewith. They may be dissolved in water or water-solvent mixtures and incorporated in gelatin silver halide emulsions. The new color formers being themselves binding agents and highly polymeric do not wash out of or migrate in a gelatin emulsion during a photographic process. The color formers may be used as the sole binding agents for light-sensitive silver salts and are useful as layers in photographic elements.

These new hydrophilic polymeric ether dye intermediates are also useful in many other dyeing operations. Thus they may be incorporated in polymers or polymer solutions used for spinning fibers or casting films, e. g., cellulose, cellulose esters and ethers, nylons, polyesters, vinyl polymers, etc. Fibers or films prepared from these compositions may be dyed by treatment with solutions of diazotized amines or other color-forming reagents. Dyes formed in fibers and films in this way are an integral part of the article and show outstanding wash-fastness, being completely unaffected by dry cleaning or prolonged and repeated washing in strong soap solutions. Other important uses include the impregnation of fabrics with the dye intermediates followed by treatment with formaldehyde and baking to insolubilize them, after which they may be treated with diazotized amines to form azo dyes. Alternatively, the intermediates may be converted to dyes first, then dyed onto fabrics and given special after-treatments, e. g., baking with formaldehyde or other bi-functional insolubilizing or cross-linking agents. Dyed articles formed in this way also exhibit superior resistance to washing, laundering, and dry cleaning.

I claim:

1. A color former consisting of a hydrophilic ether of a hydrolyzed aliphatic mono-olefin/vinyl ester interpolymer having a plurality of color former nuclei each nucleus being attached to the chain atoms of said interpolymer through a —CH₂—O— linkage, said nuclei possessing a structure of the formula:

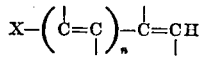

where X is a member of the group consisting of HO— and primary and secondary amino radicals and $n$ is a number from the group consisting of 0 and 1, said olefin being an aliphatic terminally unsaturated mono-olefin of less than five carbon atoms.

2. A hydrophilic color former comprising a hydrolyzed aliphatic mono-olefin/vinyl acetate interpolymer having a plurality of color former nuclei, each nucleus being connected through a —CH₂—O— linkage to a carbon atom in the chain of atoms of said polymer, said nuclei possessing a structure of the formula:

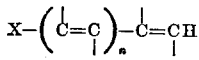

where X is a member of the group consisting of HO— and primary and secondary amino radicals and $n$ is a number from the group consisting of 0 and 1, said olefin being an aliphatic terminally unsaturated mono-olefin of less than five carbon atoms, said interpolymer containing at least 12.5 but less than 49 hydroxyl groups for every 100 chain atoms, between 1 and 30 color-forming ether groups for each 100 chain atoms, and a polymer chain in excess of 200 carbon atoms.

3. A color former comprising a hydrophilic polyether of a hydrolyzed ethylene/vinyl acetate interpolymer of mol ratio of 0.2 to 0.02 of ethylene to 1 of vinyl acetate, having a plurality of color former nuclei nucleus being connected through a —CH₂—O— linkage to chain carbon atoms of said interpolymer, said nuclei possessing a structure of the formula:

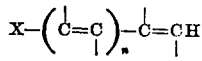

where X is a member of the group consisting of HO— and primary and secondary amino radicals and $n$ is a number from the group consisting of 0 and 1, said interpolymer containing at least 12.5 but less than 49 hydroxyl groups for every 100 chain atoms, between 1 and 30 color-forming ether groups for each 100 chain atoms, and a polymer chain in excess of 200 carbon atoms.

4. A process which comprises condensing a color former possessing a color-yielding structure of the formula:

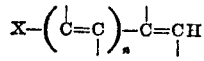

where X is a member of the group consisting of HO— and primary and secondary amino radicals and $n$ is a number from the group consisting of 0 and 1, with formaldehyde at a temperature of 25 to 80° C. in the presence of an acid catalyst and a hydrophilic hydrolyzed ethylene/vinyl acetate interpolymer of mol ratio of 0.2 to 0.02 of ethylene to 1 of vinyl acetate and containing 12.5 hydroxyl groups for every 100 chain atoms, between 1 and 30 color-forming ether groups for each 100 chain atoms, and a polymer chain in excess of 200 carbon atoms, said formaldehyde being present in an amount sufficient to introduce 12.5 to 49 color former nuclei per 100 hydroxyl groups.

5. A hydrophilic polymeric ether of 2-hydroxy-3-methyl-5-chlorobenzyl alcohol of a hydrolyzed ethylene/vinyl acetate interpolymer of mol ratio of 0.2 to 0.02 of ethylene to 1 of vinyl acetate, said ether containing recurring units of the formula:

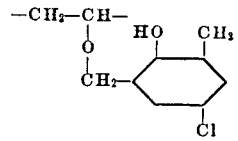

said interpolymer containing at least 12.5 but less than 49 hydroxyl groups for every 100 chain atoms, between 1 and 30 of the 2-hydroxy-3-methyl-5-chlorobenzyl groups for each 100 chain atoms, and a polymer chain in excess of 200 carbon atoms.

6. A hydrophilic polymeric ether of 2-hydroxy-3-phenylbenzyl alcohol of a hydrolyzed ethylene/vinyl acetate interpolymer of mol ratio of 0.2 to 0.02 of ethylene to 1 of vinyl acetate, said ether containing recurring units of the formula:

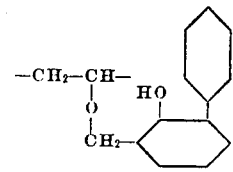

said interpolymer containing at least 12.5 but less than 49 hydroxyl groups for every 100 chain atoms, between 1 and 30 of the 2-hydroxy-3-phenylbenzyl ether groups for each 100 chain atoms, and a polymer chain in excess of 200 carbon atoms.

7. A hydrophilic polymeric ether of a 2-hydroxy-benzyl alcohol of a hydrolyzed ethylene/vinyl acetate interpolymer of mol ratio of 0.2 to 0.03 of ethylene to 1 of vinyl acetate, said ether containing recurring units of the formula:

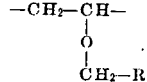

where R is an ortho-hydroxybenzene nucleus, said interpolymer containing at least 12.5 but less than 49 hydroxyl groups for every 100 chain atoms, between 1 and 30 of the ortho-hydroxybenzene groups for each 100 chain atoms, and a polymer chain in excess of 200 carbon atoms.

DAVID WILLCOX WOODWARD.

REFERENCES CITED

The following references are of record in the file of this patent:

UNITED STATES PATENTS

| Number | Name | Date |
|---|---|---|
| 2,200,429 | Perrin | May 14, 1940 |
| 2,249,536 | McDowell | July 15, 1941 |
| 2,249,537 | McDowell | July 15, 1941 |
| 2,310,943 | Dorough | Feb. 16, 1943 |